United States Patent
Wang et al.

(10) Patent No.: US 11,012,542 B2
(45) Date of Patent: May 18, 2021

(54) DATA PROCESSING METHOD AND APPARATUS

(71) Applicant: HUAWEI TECHNOLOGIES CO., LTD., Guangdong (CN)

(72) Inventors: Yi Wang, Shenzhen (CN); Dong Lin, Shenzhen (CN); Yong Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 343 days.

(21) Appl. No.: 16/224,716

(22) Filed: Dec. 18, 2018

(65) Prior Publication Data
US 2019/0124184 A1  Apr. 25, 2019

Related U.S. Application Data

(63) Continuation of application No. PCT/CN2017/088315, filed on Jun. 14, 2017.

(30) Foreign Application Priority Data

Jun. 19, 2016 (CN) .......................... 201610438236.2

(51) Int. Cl.
*H04L 29/06* (2006.01)
*H04L 12/721* (2013.01)
(Continued)

(52) U.S. Cl.
CPC .............. *H04L 69/22* (2013.01); *H04L 45/38* (2013.01); *H04L 45/54* (2013.01); *H04L 45/745* (2013.01); *H04L 47/2483* (2013.01)

(58) Field of Classification Search
CPC ......... H04L 69/22; H04L 45/38; H04L 45/54; H04L 45/745; H04L 45/7457; H04L 47/2483

See application file for complete search history.

(56) References Cited

U.S. PATENT DOCUMENTS 9,674,081 B1 * 6/2017 Jiang ..................... H04L 45/38
10,034,070 B1 * 7/2018 Viljoen .................. H04L 45/64
(Continued)

FOREIGN PATENT DOCUMENTS

CN  104821890 A  8/2015
CN  104980431 A  10/2015
(Continued)

OTHER PUBLICATIONS

Sukapuram, Radhika and Gautam Barua, "Enhanced Algorithms for Consistent Network Updates", 2015, IEEE, Conference on Network Function Virtualization and Software Defined Network (NFV-SDN). (Year: 2015).*

(Continued)

*Primary Examiner* — Nam T Tran
(74) *Attorney, Agent, or Firm* — Fish & Richardson P.C.

(57) ABSTRACT

The present application discloses data processing methods. Example methods include obtaining information about a header field of a data packet and searching an exact match flow table for an exact match entry that matches the data packet. When the matching exact match is found, a determination is made as to whether an update time of a wildcard entry corresponding to the exact match entry is before a creation time of the exact match entry. In response to determining that the update time is before the creation time of the exact match entry, the data packet is processed according to an action instruction corresponding to the exact match entry. In response to determining that the update time of the wildcard entry corresponding to the exact match entry is not before the creation time of the exact match entry, the exact match entry is deleted.

14 Claims, 8 Drawing Sheets

(51) Int. Cl.
   *H04L 12/741* (2013.01)
   *H04L 12/851* (2013.01)

(56) References Cited

U.S. PATENT DOCUMENTS

| | | | |
|---|---|---|---|
| 2014/0112150 A1 | 4/2014 | Ko et al. | |
| 2016/0050148 A1* | 2/2016 | Xu | H04L 45/64 370/235 |
| 2016/0241485 A1* | 8/2016 | Ahn | H04L 45/38 |

FOREIGN PATENT DOCUMENTS

| | | | |
|---|---|---|---|
| CN | 105099916 A | 11/2015 | |
| CN | 105224692 A | 1/2016 | |
| CN | 105429879 A | 3/2016 | |
| EP | 2787698 A2 | 10/2014 | |
| WO | 2015032333 A1 | 3/2015 | |
| WO | 2016008934 A1 | 1/2016 | |
| WO | WO-2016008934 A1 * | 1/2016 | H04L 45/38 |

OTHER PUBLICATIONS

Ben Pfaff et al, The Design and Implementation of Open vSwitch. Proceedings of the 12th USENIX Symposium on Networked Systems Design and Implementation (NSDI '15), May 4-6, 2015, 15 pages.
Pat Bosshart et al, Forwarding Metamorphosis: Fast Programmable Match-Action Processing in Hardware for SDN. SIGCOMM'13, Aug. 12-16, 2013, Hong Kong, China, 12 pages.
International Search Report and Written Opinion issued in International Application No. PCT/CN2017/088315 dated Sep. 1, 2017, 15 pages.
Office Action issued in Chinese Application No. 201610438236.2 dated May 27, 2020, 12 pages (with English translation).
Sukapu Ram Radhika et al: "Enhanced algorithms for consistent network updates", 2015 IEEE Conference on Network Function Virtualization and Software Defined Network, IEEE, Nov. 18, 2015, pp. 184-190, XP032852441.
Jeffrey C. Mogul et al: "DevoFlow: Cost-Effective Flow Management for High Performance Enterprise Networks", Proceedings of the 9th ACM SIGCOMM Workshop on Hot Topics in Networks, Hotnets 10, Oct. 2010, pp. 1-6, XP055178809.
Extended European Search Report issued in European Application No. 17814642.9 dated Mar. 2, 2019, 12 pages.

* cited by examiner

DATA PROCESSING METHOD AND APPARATUS

CROSS-REFERENCE TO RELATED APPLICATIONS

This application is a continuation of International Application No. PCT/CN2017/088315, filed on Jun. 14, 2017, which claims priority to Chinese Patent Application No. 201610438236.2, filed on Jun. 19, 2016, The disclosures of the aforementioned applications are hereby incorporated by reference in their entireties.

TECHNICAL FIELD

This application relates to the field of communications technologies, and in particular, to a data processing method and apparatus.

BACKGROUND

A core of a Software Defined Network (SDN for short) is to separate a control plane of a network device from a data plane, so as to control the network device flexibly in a centralized manner. The control plane is configured to provide a flow entry, and the data plane is configured to process data according to a flow table generated by using flow entries.

Before processing data according to a flow table, the data plane first determines whether the flow table is being updated. Only when a flow table is not updated, the flow table is searched for a flow entry that matches a data packet, and further the data packet is processed according to an action instruction corresponding to the matched flow entry.

In a flow table updating process, searching of the flow table for the flow entry that matches the data packet is suspended. Consequently, a data packet processing delay is caused, and network performance is affected.

SUMMARY

To resolve a prior-art problem of a data packet processing delay caused by updating of a flow table, embodiments of the present invention provide a data processing method and apparatus. The technical solutions are as follows:

According to a first aspect, an embodiment of the present invention provides a data processing method, where the method includes:

obtaining information about a header field of a data packet;

searching, by using the information, an exact match flow table for an exact match entry that matches the data packet;

when the exact match entry that matches the data packet is found, determining whether an update time of a wildcard entry corresponding to the exact match entry is before a creation time of the exact match entry, where an exact flow in the exact match entry is a subset of a rule in the wildcard entry corresponding to the exact match entry; and when the update time of the wildcard entry corresponding to the exact match entry is before the creation time of the exact match entry, processing the data packet according to an action instruction corresponding to the exact match entry; or when the update time of the wildcard entry corresponding to the exact match entry is not before the creation time of the exact match entry, deleting the exact match entry.

In this embodiment of the present invention, the exact match entry includes an exact flow, a time stamp, and pointing information of a wildcard entry. The exact flow may be specific to all header fields of the data packet, that is, the exact flow is used to match values of all the header fields of the data packet. When values of the exact flow are the same as the values of all the header fields of the data packet, the exact match entry in which the exact flow is located is an exact match entry that matches the data packet. In addition, because the exact flow may be specific to all the header fields of the data packet, a found exact match entry that matches the data packet is unique. A searching process can be stopped as long as the exact match entry is found. Therefore, a consumed time is relatively short, and accuracy is high.

The exact match flow table is searched directly by using the information about the header field of the data packet for the exact match entry that matches the data packet, and when the exact match entry that matches the data packet is found, whether the wildcard entry corresponding to the exact match entry is updated before the creation time of the exact match entry is determined. When the update time of the wildcard entry corresponding to the exact match entry is before the creation time of the exact match entry, the data packet is processed according to the action instruction corresponding to the exact match entry. Before the data packet is processed according to the action instruction corresponding to the exact match entry, it is determined that the update time of the wildcard entry corresponding to the exact match entry is before the creation time of the exact match entry. Therefore, the exact match entry used to process the data packet is valid, there is no need to suspend, in a flow table updating process, searching for a flow entry that matches the data packet to avoid using an exact match entry that is invalid because of updating of the wildcard entry, and flow table updating and flow entry searching can be performed simultaneously. Therefore, there is no delay in data packet processing, a data processing speed is improved, and network performance is improved.

In a possible implementation of this application, the determining whether an update time of a wildcard entry corresponding to the exact match entry is before a creation time of the exact match entry includes:

obtaining, in the exact match entry, pointing information of the wildcard entry corresponding to the exact match entry;

determining, according to the pointing information, the wildcard entry corresponding to the exact match entry; and obtaining, in the wildcard entry corresponding to the exact match entry, the update time of the wildcard entry corresponding to the exact match entry.

In this embodiment of the present invention, the exact match entry includes an exact flow, a time stamp, and pointing information of the wildcard entry, and the wildcard entry includes a rule, an action instruction, and a time stamp. If the exact flow is the same as a corresponding value in the rule, that is, the exact flow matches the rule, the exact match flow table in which the exact flow is located is corresponding to the wildcard flow table in which the rule is located. The pointing information is obtained in the exact match entry, the corresponding wildcard entry may be determined according to the pointing information, and then the update time is obtained in the wildcard entry. In addition, the creation time of the exact match entry may be obtained directly in the exact match entry.

Optionally, the pointing information is a pointer that points to the wildcard entry corresponding to the exact match entry, or an identifier of the wildcard entry corresponding to the exact match entry.

If the pointing information is a pointer, the wildcard entry corresponding to the exact match entry may be directly accessed by using the pointer. If the pointing information is an identifier, the corresponding wildcard entry may be found in wildcard entries by using the identifier.

Optionally, the method further includes:

receiving a wildcard entry update instruction, where the wildcard entry update instruction includes a to-be-updated rule; and updating a rule and an update time in a wildcard entry according to the wildcard entry update instruction.

When the update instruction is received, only the wildcard entry and an update time of a corresponding action instruction are updated. An operation is simple, and impact on the network is small.

In another possible implementation of this application, the method further includes:

when the update time of the wildcard entry corresponding to the exact match entry is not before the creation time of the exact match entry, searching, by using the information, a wildcard flow table for a wildcard entry that matches the data packet.

Each time a wildcard entry is updated, all exact match flow tables are searched for an exact match entry that matches the updated wildcard entry and the exact match entry is deleted; by comparison, in this embodiment of the present invention, the exact match entry corresponding to the updated wildcard entry is deleted when the exact match entry is found, so that an adverse effect caused by searching on a processing speed and performance of a network device is effectively avoided, and an exact match entry is not correspondingly updated each time the wildcard entry is updated. Therefore, a quantity of times of updating the exact match entry is effectively reduced, and the adverse effect on the processing speed and performance of the network device is further reduced.

In addition, when the exact match entry that matches the updated wildcard entry is searched for and deleted, in order to control the adverse effect caused by searching on the network device, a quantity of exact match entries is limited. Specific values are set for all header fields of the data packet in the wildcard entry, and specific values are set for some header fields of the data packet in the exact match entry. Therefore, when the wildcard entry matches the data packet, all wildcard entries need to sequentially match the data packet, to find a wildcard entry that best matches the data packet, and when the exact match entry matches the data packet, only one exact match entry that matches the data packet needs to be found. It can be learned that a matching speed of the exact match entry is far better than that of the wildcard entry, and a larger quantity of exact match entries indicates a higher probability of matching between the data packet and the exact match entry. In this embodiment of the present invention, there is no adverse effect on the network device, and there is no limitation on the quantity of exact match entries. Compared with a case in which the exact match entry that matches the updated wildcard entry is searched for and deleted, the exact match entry can be fully used to match the data packet, so that a matching speed of the data packet is improved, and a forwarding capability of the network device is improved.

In another possible implementation of this application, the method further includes:

when the exact match entry that matches the data packet is not found, searching, by using the information, a wildcard flow table for a wildcard entry that matches the data packet.

In another possible implementation of this application, the method further includes:

when the exact match entry that matches the data packet is not found, searching, by using the information, a wildcard flow table for a wildcard entry that matches the data packet.

In this embodiment, the wildcard entry includes a rule, an action instruction, and a time stamp. The wildcard entry may be specific to some header fields of the data packet, that is, the wildcard entry is used to match values of the some header fields of the data packet. When a value of the rule is the same as a value of a corresponding header field of the data packet, the wildcard entry in which the rule is located is a wildcard entry that matches the data packet.

Optionally, the method further includes:

when the wildcard entry that matches the data packet is found, processing the data packet according to an action instruction corresponding to the wildcard entry, and creating, in the exact match flow table, an exact match entry in which the information is corresponding to the action instruction corresponding to the wildcard entry.

The exact match entry is created by using the matched wildcard entry, so as to improve a matching speed during next matching.

According to a second aspect, an embodiment of the present invention provides a data processing apparatus, where the apparatus includes a unit configured to implement the method according to the first aspect, such as an obtaining unit, an exact match unit, a determining unit, an exact match processing unit, and a deletion unit.

The technical solutions provided in the embodiments of the present invention bring the following beneficial effects:

The exact match flow table is searched directly by using the information about the header field of the data packet for the exact match entry that matches the data packet, and when the exact match entry that matches the data packet is found, whether the wildcard entry corresponding to the exact match entry is updated before the creation time of the exact match entry is determined. When the update time of the wildcard entry corresponding to the exact match entry is before the creation time of the exact match entry, the data packet is processed according to the action instruction corresponding to the exact match entry. Before the data packet is processed according to the action instruction corresponding to the exact match entry, it is determined that the update time of the wildcard entry corresponding to the exact match entry is before the creation time of the exact match entry. Therefore, the exact match entry used to process the data packet is valid, there is no need to suspend, in a flow table updating process, searching for a flow entry that matches the data packet to avoid using an exact match entry that is invalid because of updating of the wildcard entry, and flow table updating and flow entry searching can be performed simultaneously. Therefore, there is no delay in data packet processing, a data processing speed is improved, and network performance is improved.

DESCRIPTION OF EMBODIMENTS

To make objectives, technical solutions, and advantages of this application clearer, the following further describes implementations of the present invention in detail with reference to the accompanying drawings.

Figure 1:
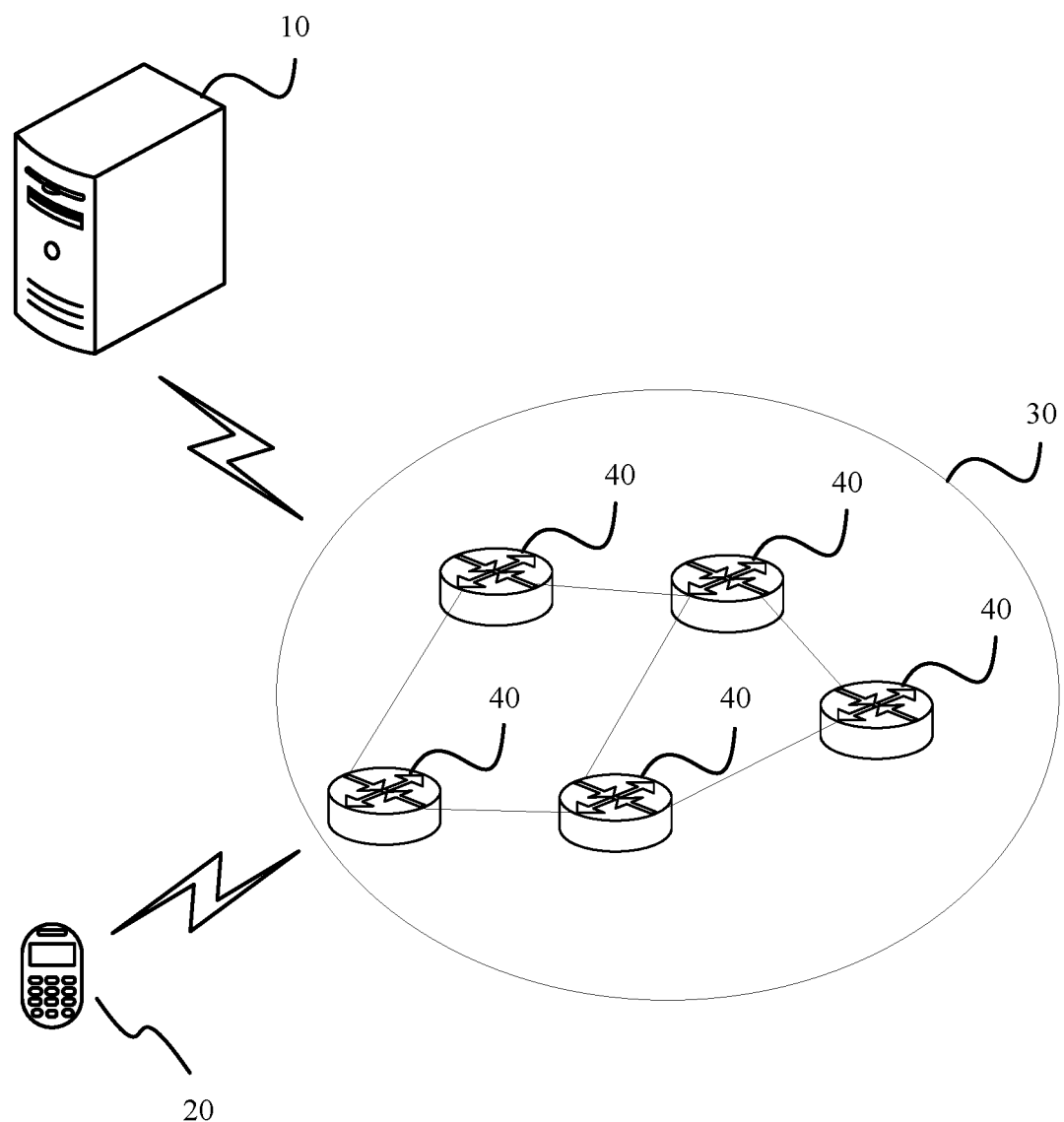
FIG. 1 is a diagram of an application scenario of a data processing method according to an embodiment of the present invention.

The following first briefly describes, with reference to FIG. 1, an application scenario of a data processing method provided in an embodiment of the present invention. Referring to FIG. 1, a first terminal 10 and a second terminal 20 separately access a Software Defined Network (Software Defined Network, SDN for short) 30. A data packet sent by the first terminal 10 to the second terminal 20 is forwarded to the second terminal by using a network device 40 in the SDN 30. The network device 40 may be at least one of a switch, a router, or a gateway.

Figure 2:
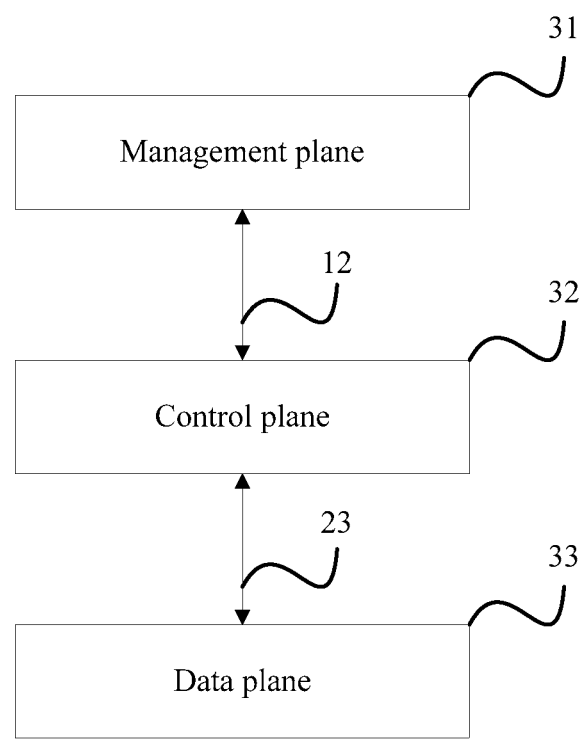
FIG. 2 is an architectural diagram of a Software Defined Network according to an embodiment of the present invention.

Specifically, referring to FIG. 2, the SDN 30 includes a management plane 31, a control plane 32 (that is, a control layer), and a data plane 33 (that is, an infrastructure layer). The control plane 32 communicates with the management plane 31 by using a northbound interface 12, and the control plane 32 communicates with the data plane 33 by using a southbound interface 23.

The management plane 31 calls a basic service of the control plane 32 by using the northbound interface 12, such as link information collection, flow table maintenance, and forwarding rule generation, so as to control data packet forwarding on the data plane 33. The control plane 32 includes a controller provided with software, is responsible for collecting global link information in a centralized manner by using the southbound interface 23, and generates, by means of calculation according to a routing policy, a rule of forwarding a data packet. The rule is delivered to a network device of the data plane 33 by using the southbound interface 23. The data plane 33 includes a network device, and is responsible for searching a flow table and forwarding a data packet. Specifically, if a data packet matches a rule in a flow table, the data packet is processed according to an action instruction (action) corresponding to the matched rule; or if a data packet does not match a rule in a flow table, the data packet is sent to the control plane 32, and the control plane 32 determines a manner of processing the data packet. In addition, the data plane 33 may further collect statistics about a matching quantity of each flow entry, and record the quantity in each flow entry of the flow table.

In specific implementation, a flow table stored in a network device includes a wildcard flow table and an exact match flow table (microflow table). In this application, structures of the wildcard flow table and the exact match flow table are improved. Specifically, a time stamp is added to each of the wildcard flow table and the exact match flow table. The time stamp may be a physical time value, such as year xxxx, month xx, date xx, hour xx, minute xx, and second xx, or may be a logical time value that has a positive correlation with a physical time value, such as 100 or 200. A physical time value corresponding to 100 is before a physical time value corresponding to 200.

Figure 3A:
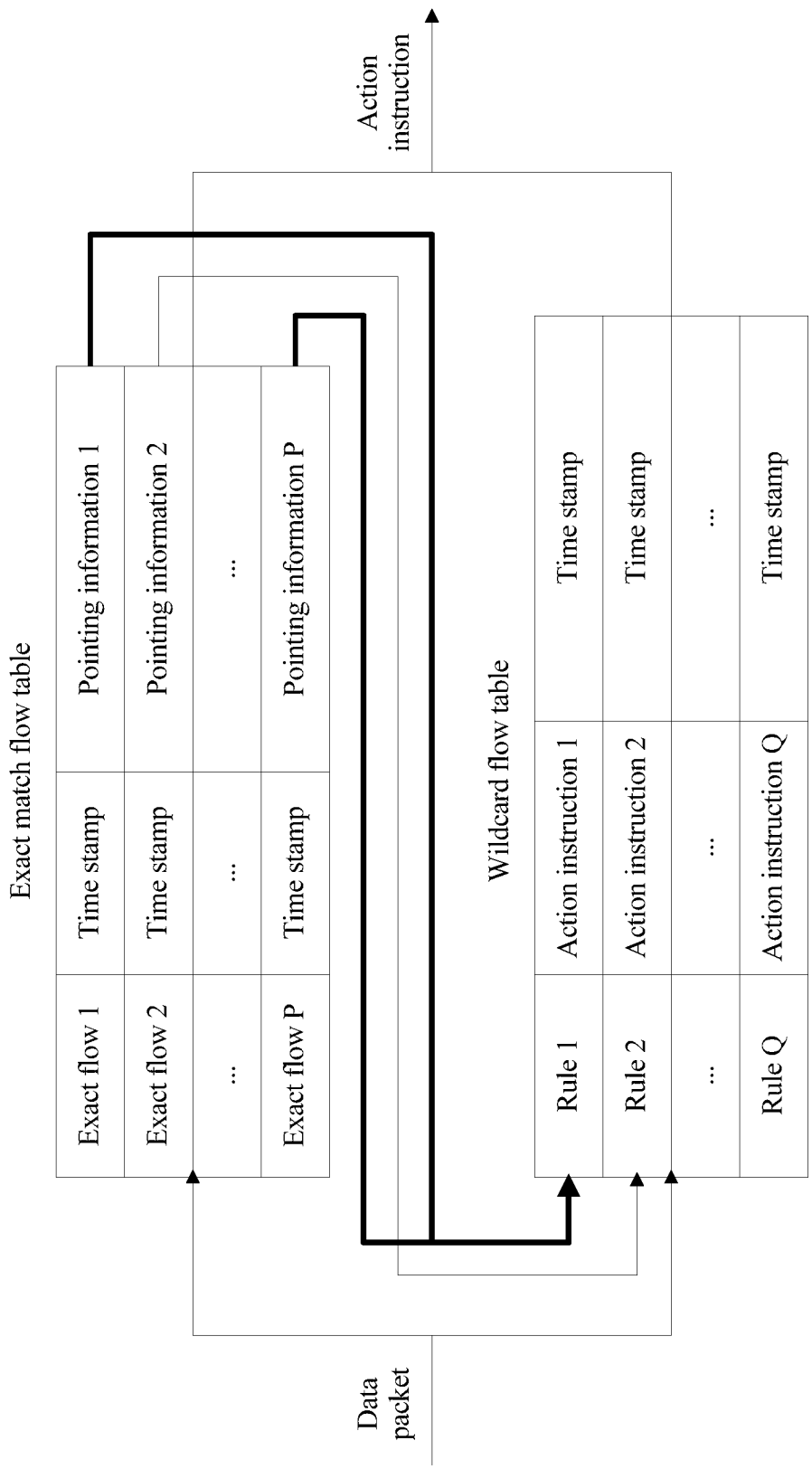
FIG. 3a is a schematic structural diagram of an exact match flow table and a wildcard flow table according to an embodiment of the present invention.
Figure 3B:
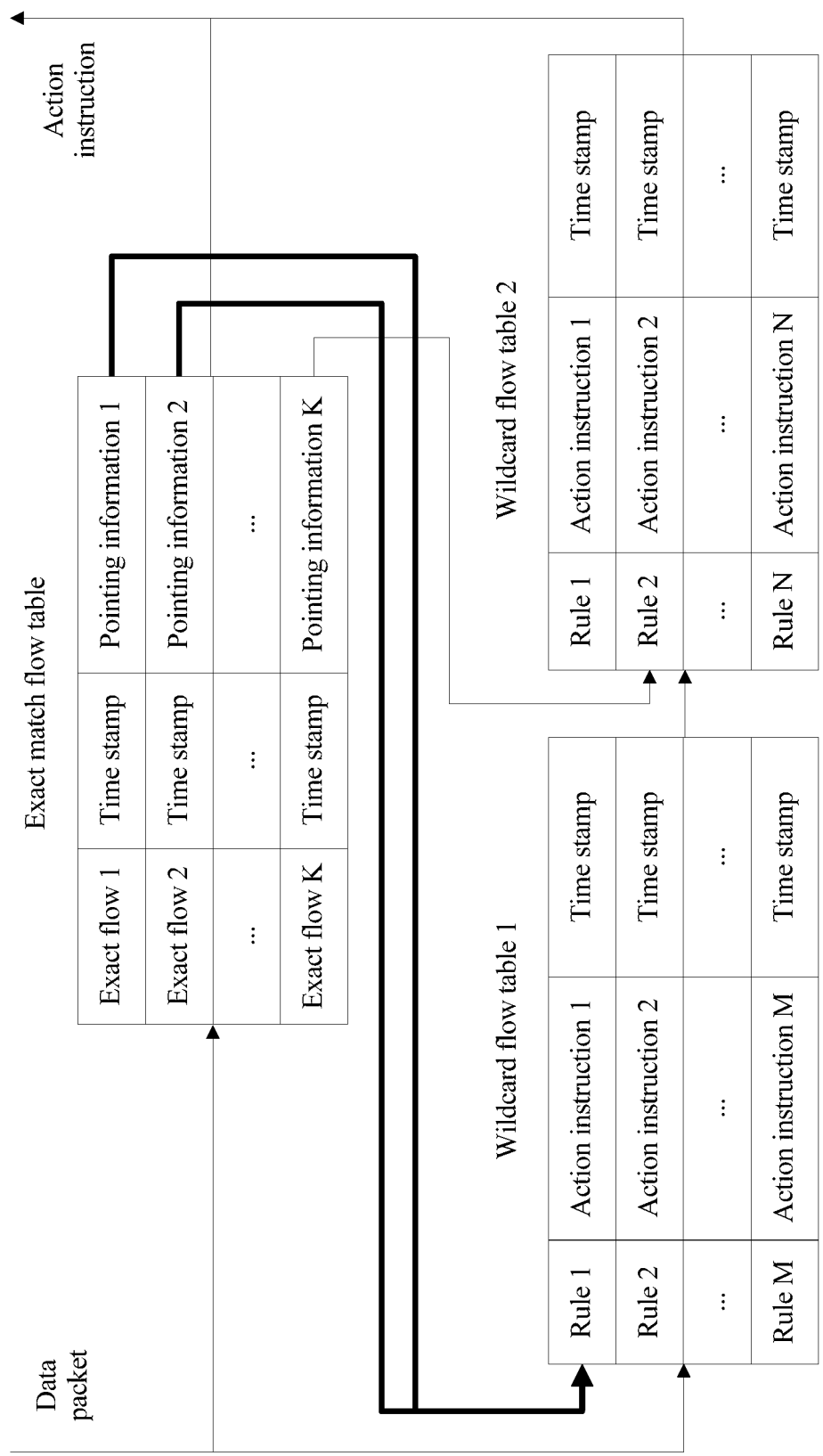
FIG. 3b is a schematic structural diagram of an exact match flow table and a plurality of cascaded wildcard flow tables according to an embodiment of the present invention.

Referring to FIG. 3a and FIG. 3b, a wildcard entry in a wildcard flow table includes a rule, an action instruction (action) corresponding to the rule, and a time stamp corresponding to the rule. The rule may be specific to some header fields of a data packet, that is, the rule is used to match values of some header fields of the data packet. Action instructions corresponding to rules may include one or more of port forwarding, broadcasting, or discarding. The time stamp corresponding to the rule indicates an update time of the wildcard entry.

In actual application, only one wildcard flow table may be used to match the data packet (referring to FIG. 3a), or a plurality of cascaded wildcard flow tables may be sequentially cascaded with the data packet (referring to FIG. 3b). Rules of the plurality of cascaded wildcard flow tables give different header fields, so that a matching process is decomposed into a plurality of steps, to form a pipeline processing manner, thereby reducing a total quantity of entries. When the plurality of cascaded wildcard flow tables are used, an action instruction may further include: matching a specified wildcard flow table.

Referring to FIG. 3a and FIG. 3b, an exact match entry in an exact match flow table includes an exact flow (micro flow), a time stamp corresponding to the exact flow, and pointing information of a wildcard entry. The exact flow may be specific to all header fields of a data packet, that is, the exact flow is used to match values of all the header fields of the data packet. An action instruction corresponding to the exact flow is the same as an action instruction corresponding to a rule that matches the exact flow, that is, action instructions corresponding to exact flows may include one or more of port forwarding, broadcasting, or discarding. The time stamp corresponding to the exact flow indicates a creation time of the exact match entry. The pointing information of the wildcard entry may be a pointer that points to a wildcard entry corresponding to the exact match entry, or an identifier of a wildcard entry corresponding to the exact match entry.

The following describes, with reference to a specific hardware structure, a data processing apparatus provided in an embodiment of the present invention.

Figure 4:
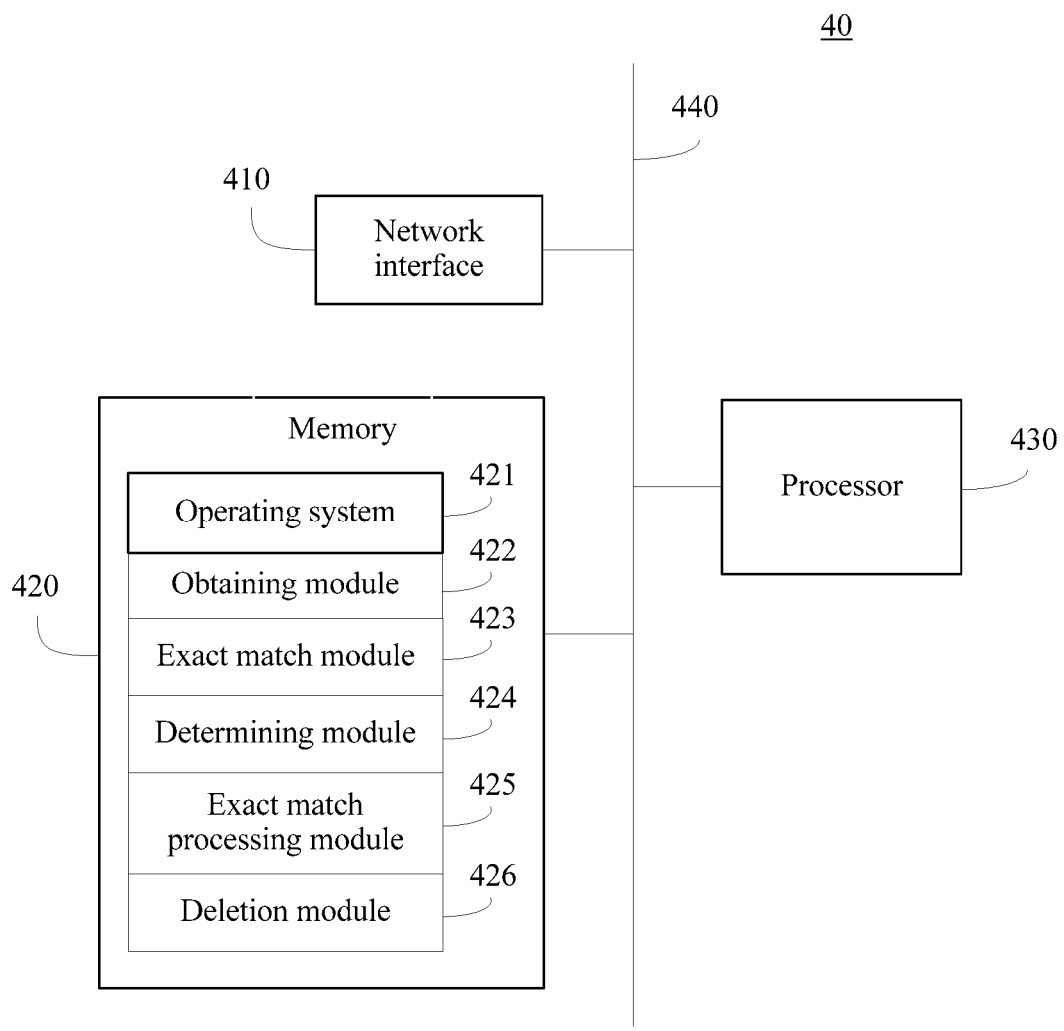
FIG. 4 is a diagram of a hardware structure of a data processing apparatus according to an embodiment of the present invention.

Referring to FIG. 4, a data processing apparatus 40 may be a network device such as a switch. The apparatus 40 may include components such as a network interface 410, a memory 420 that includes one or more computer readable storage media, and a processor 430 that includes one or more processing cores. Persons skilled in the art may understand that the structure shown in FIG. 4 imposes no limitation on the apparatus, and the apparatus may include more or fewer components than those shown in the figure, or may combine some components, or have different component arrangements.

The processor 430 is a control center of the apparatus 40, is connected to all parts of the entire apparatus 40 by using various interfaces and lines, and performs various functions of the apparatus 40 and processes data by running or executing a software program and/or a module stored in the memory 420 and by invoking data stored in the memory 420, so as to perform overall monitoring on the apparatus 40. Optionally, the processor 430 may include the one or more processing cores. Optionally, an application processor and a modem processor may be integrated into the processor 430. The application processor mainly processes an operating system, a user interface, an application program, and the like, and the modem processor mainly processes radio communication. It may be understood that the modem processor may not be integrated into the processor 430.

The memory 420 may be configured to store various types of data such as various configuration parameters, a software program, and a module, and the processor 430 executes various functional applications and data processing by running the software program and the module that are stored in the memory 420. The memory 420 may mainly include a program storage area and a data storage area. The program storage area may store an operating system 421, an obtaining module 422, an exact match module 423, a determining module 424, an exact match processing module 425, and a deletion module 426, and the data storage area may store data created according to use of the apparatus 40, such as a header field of a data packet. In addition, the memory 420 may include a high-speed random access memory, and may further include a nonvolatile memory, such as at least one magnetic disk storage device, a flash storage device, or another nonvolatile solid-state storage device. Correspondingly, the memory 420 may further include a memory controller, so as to provide the processor 430 with access to the memory 420.

There may be a plurality of network interfaces 410, and the network interface 410 is configured to communicate with another network device.

Optionally, the apparatus 40 may further include a bus 440. Both the memory 420 and the network interface 410 are connected to the processor 430 by using the bus 440.

Figure 5:
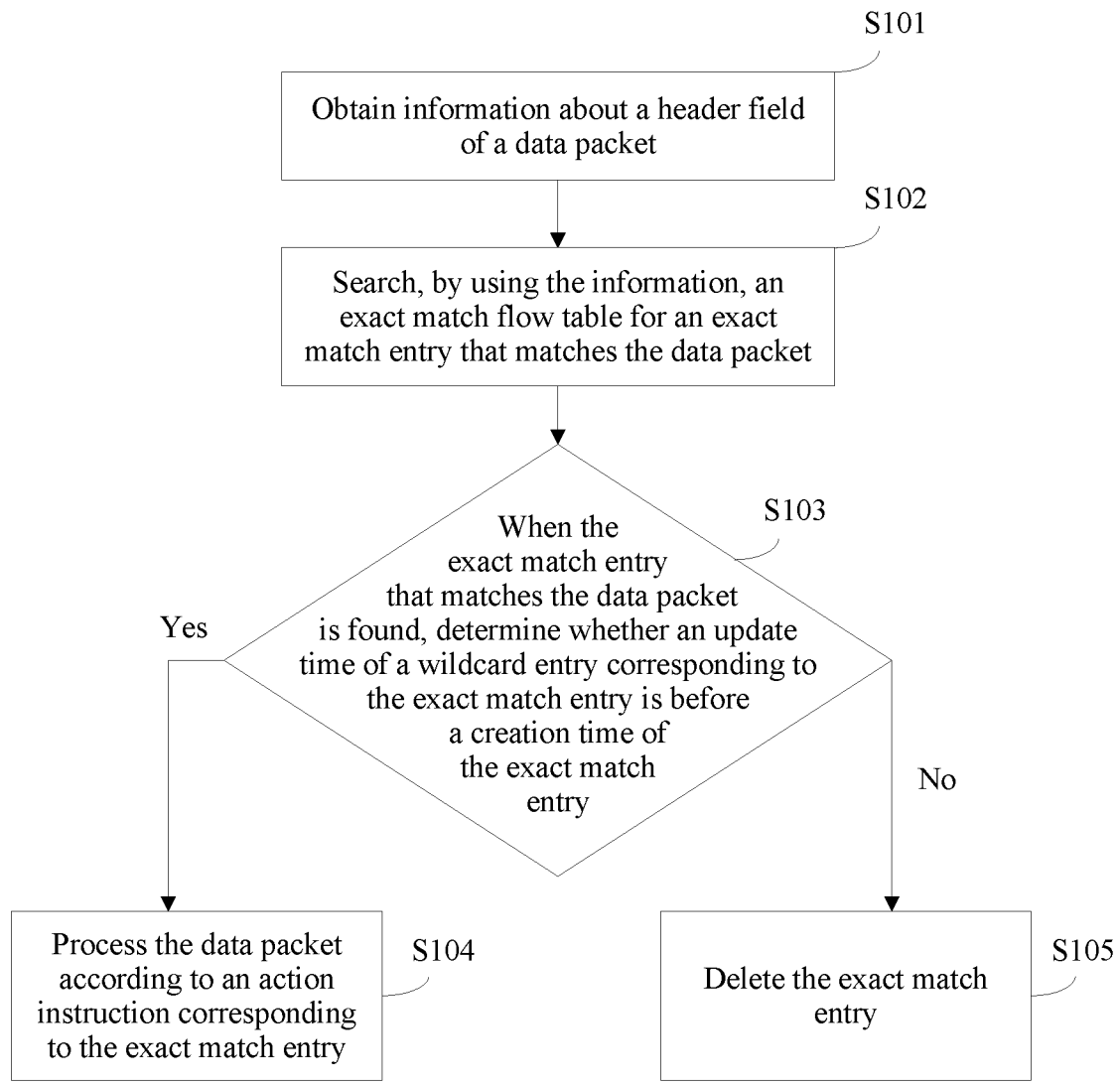
FIG. 5 is a flowchart of a data processing method according to an embodiment of the present invention.

An embodiment of the present invention provides a data processing method. Referring to FIG. 5, the method includes the following steps.

Step S101: Obtain information about a header field of a data packet.

Specifically, the data packet usually includes a header and a data part. The header may include one or more fields of an input port, a source Media Access Control (MAC for short) address, a destination MAC address, an Ethernet type, a virtual local area network identifier (VLAN ID for short), a source Internet Protocol (IP for short) address, a destination IP address, an IP port, a Transmission Control Protocol (TCP for short) source port, or a TCP destination port.

Step S102: Search, by using the information, an exact match flow table for an exact match entry that matches the data packet.

In this embodiment, the exact match entry includes an exact flow, a time stamp, and pointing information of a wildcard entry. The exact flow may be specific to all header fields of the data packet, that is, the exact flow is used to match values of all the header fields of the data packet. When values of the exact flow are the same as the values of all the header fields of the data packet, the exact match entry in which the exact flow is located is an exact match entry that matches the data packet.

Step S103: When the exact match entry that matches the data packet is found, determine whether an update time of a wildcard entry corresponding to the exact match entry is before a creation time of the exact match entry; and when the update time of the wildcard entry corresponding to the exact match entry is before the creation time of the exact match entry, perform step S104; or when the update time of the wildcard entry corresponding to the exact match entry is not before the creation time of the exact match entry, perform step S105.

In this embodiment, the wildcard entry includes a rule, an action instruction, and a time stamp. The wildcard entry may be specific to some header fields of the data packet, that is, the wildcard entry is used to match values of the some header fields of the data packet. When a value of the rule is the same as a value of a corresponding header field of the data packet, the wildcard entry in which the rule is located is a wildcard entry that matches the data packet.

The exact flow in the exact match entry is a subset of the rule in the wildcard entry corresponding to the exact match entry. If the exact flow is the same as a corresponding value in the rule, that is, the exact flow matches the rule, the exact match flow table in which the exact flow is located is corresponding to a wildcard flow table in which the rule is located. For example, a rule in a wildcard entry A is an input port a1 and a source MAC address b1, and a rule in another wildcard entry B is a source IP address f1 and a destination IP address g1. An exact flow in an exact match entry C is an input port a1, a source MAC address b1, a destination MAC address c1, an Ethernet type d1, a VLAN ID e1, a source IP address f1, a destination IP address g1, an IP port h1, a TCP source port i1, and a TCP destination port j1. An exact flow in another exact match entry D is an input port a1, a source MAC address b1, a destination MAC address c2, an Ethernet type d2, a VLAN ID e2, a source IP address f2, a destination IP address g2, an IP port h2, a TCP source port i2, and a TCP destination port j2. An exact flow in still another exact match entry E is an input port a2, a source MAC address b2, a destination MAC address c1, an Ethernet type d1, a VLAN ID e1, a source IP address f1, a destination IP address g1, an IP port h1, a TCP source port i1, and a TCP destination port j1. The exact match entry C is corresponding to the wildcard entry A and the wildcard entry B, the exact match entry D is corresponding to the wildcard entry A, and the exact match entry E is corresponding to the wildcard entry B.

It should be noted that when a flow table is updated, a control plane delivers a new rule to a data plane, a rule and an update time in a wildcard entry in which the rule is located are updated, and an exact match entry corresponding to the updated wildcard entry needs to be correspondingly updated before using. Whether the exact match entry is correspondingly updated after the corresponding wildcard entry is updated may be determined by determining whether the update time of the wildcard entry corresponding to the exact match entry is before the creation time of the exact match entry. If the update time of the wildcard entry corresponding to the exact match entry is before the creation time of the exact match entry, it indicates that the exact match entry is created after the corresponding wildcard entry is updated, and can be used; or if the update time of the wildcard entry corresponding to the exact match entry is not before the creation time of the exact match entry, it indicates that the corresponding wildcard entry is updated after the exact match entry is created, and the exact match entry cannot be used.

Step S104: Process the data packet according to an action instruction corresponding to the exact match entry.

In this embodiment, the action instruction corresponding to the exact match entry is an action instruction in a wildcard flow table corresponding to the exact match entry. Specifically, the action instruction may include port forwarding, broadcasting, or discarding. Correspondingly, processing the data packet may be: sending the data packet on one or more ports, sending the data packet on all ports, or discarding the data packet.

Step S105: Delete the exact match entry.

In this embodiment of the present invention, the exact match flow table is searched directly by using the information about the header field of the data packet for the exact match entry that matches the data packet, and when the exact match entry that matches the data packet is found, whether the wildcard entry corresponding to the exact match entry is updated before the creation time of the exact match entry is determined. When the update time of the wildcard entry corresponding to the exact match entry is before the creation time of the exact match entry, the data packet is processed according to the action instruction corresponding to the exact match entry. Before the data packet is processed according to the action instruction corresponding to the exact match entry, it is determined that the update time of the wildcard entry corresponding to the exact match entry is before the creation time of the exact match entry. Therefore, the exact match entry used to process the data packet is valid, there is no need to suspend, in a flow table updating process, searching for a flow entry that matches the data packet to avoid using an exact match entry that is invalid because of updating of the wildcard entry, and flow table updating and flow entry searching can be performed simultaneously. Therefore, there is no delay in data packet processing, a data processing speed is improved, and network performance is improved.

It should be noted that step S101 may be implemented by the processor 430 in the apparatus shown in FIG. 4 by executing the obtaining module 422 in the memory 420, step S102 may be implemented by the processor 430 in the apparatus shown in FIG. 4 by executing the exact match module 423 in the memory 420, step S103 may be implemented by the processor 430 in the apparatus shown in FIG. 4 by executing the determining module 424 in the memory 420, step S104 may be implemented by the processor 430 in the apparatus shown in FIG. 4 by executing the exact match processing module 425 in the memory 420, and step S105 may be implemented by the processor 430 in the apparatus shown in FIG. 4 by executing the deletion module 426 in the memory 420.

Figure 6:
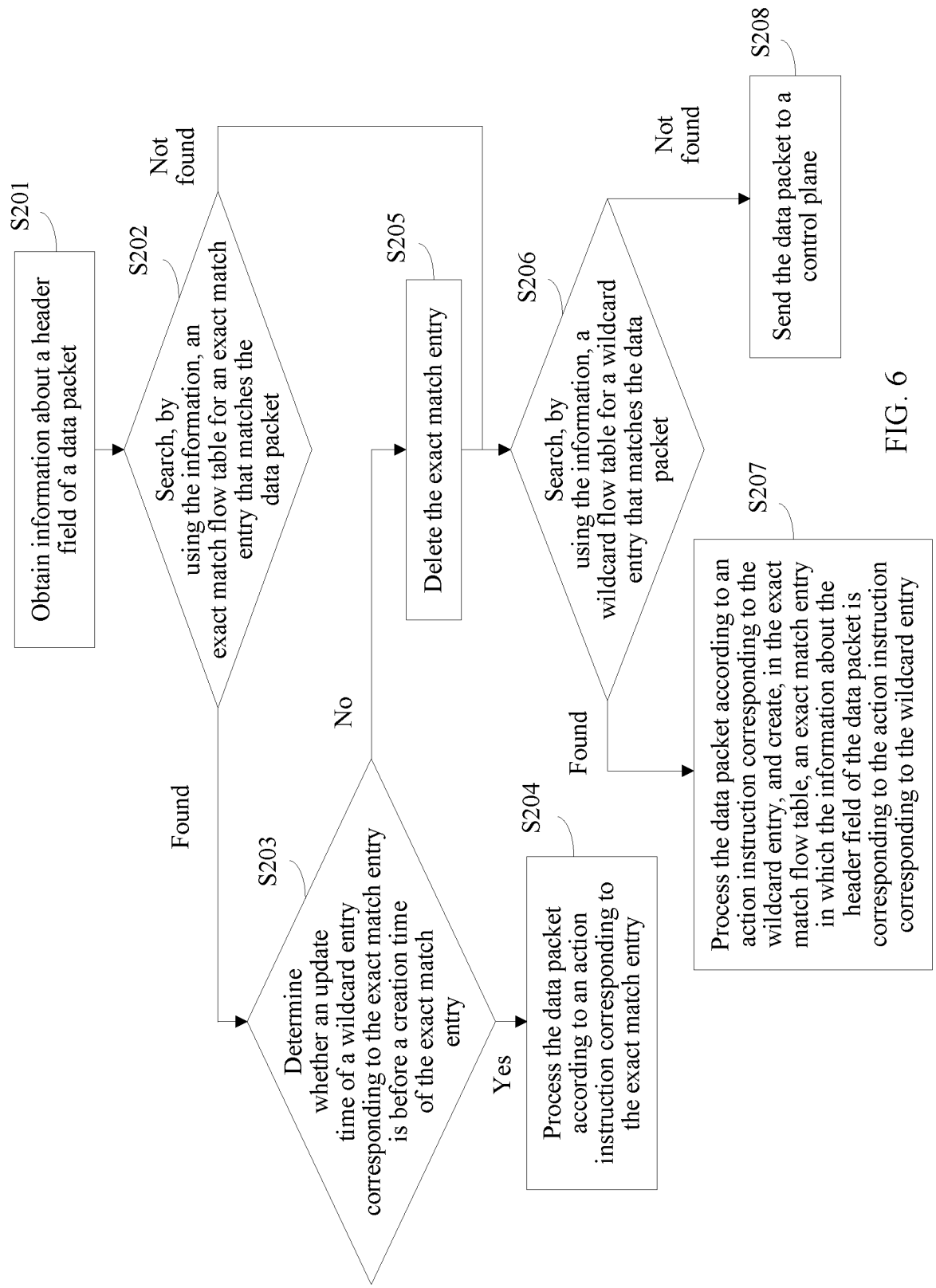
FIG. 6 is a flowchart of a data processing method according to an embodiment of the present invention.

An embodiment of the present invention provides a data processing method. Referring to FIG. 6, the method includes the following steps:

Step S201: Obtain information about a header field of a data packet.

Optionally, step S201 may include:

receiving the data packet; and parsing the data packet, to obtain the information about the header field of the data packet.

In actual application, the data packet may be sent by the first terminal 10 shown in FIG. 1 to a network device 40, or may be sent by a network device 40 shown in FIG. 1 to another network device 40.

Specifically, the data packet usually includes a header and a data part. The header may include one or more fields of an input port, a source MAC address, a destination MAC address, an Ethernet type, a VLAN ID, a source IP address, a destination IP address, an IP port, a TCP source port, or a TCP destination port.

In specific implementation, the information about the header field may be extracted from the parsed data packet according to a structure feature of the data packet.

Step S202: Search, by using the information, an exact match flow table for an exact match entry that matches the data packet; and when the exact match entry that matches the data packet is found, perform step S203; or when the exact match entry that matches the data packet is not found, perform step S206.

In this embodiment, the exact match entry includes an exact flow, a time stamp, and pointing information of a wildcard entry. The exact flow may be specific to all header fields of the data packet, that is, the exact flow is used to match values of all the header fields of the data packet. When values of the exact flow are the same as the values of all the header fields of the data packet, the exact match entry in which the exact flow is located is an exact match entry that matches the data packet.

Step S203: Determine whether an update time of a wildcard entry corresponding to the exact match entry is before a creation time of the exact match entry; and when the update time of the wildcard entry corresponding to the exact match entry is before the creation time of the exact match entry, perform step S204; or when the update time of the wildcard entry corresponding to the exact match entry is not before the creation time of the exact match entry, perform step S205 and step S206.

In this embodiment, the wildcard entry includes a rule, an action instruction, and a time stamp. The wildcard entry may be specific to some header fields of the data packet, that is, the wildcard entry is used to match values of the some header fields of the data packet. When a value of the rule is the same as a value of a corresponding header field of the data packet, the wildcard entry in which the rule is located is a wildcard entry that matches the data packet. If the exact flow is the same as a corresponding value in the rule, that is, the exact flow matches the rule, the exact match flow table in which the exact flow is located is corresponding to a wildcard flow table in which the rule is located.

In an implementation of this embodiment, the method may further include:

receiving a wildcard entry update instruction, where the wildcard entry update instruction includes a to-be-updated rule; and updating a rule and an update time in a wildcard entry according to the wildcard entry update instruction.

In specific implementation, a control plane delivers a wildcard entry update instruction to each network device, and the wildcard entry update instruction includes a to-be-updated rule. Specifically, if a purpose of the wildcard entry update instruction is to modify a rule, the wildcard entry update instruction further includes a to-be-modified rule (or find all identifiers of the to-be-modified rule in the wildcard entry); or if a purpose of the wildcard entry update instruction is to add a rule, the wildcard entry update instruction further includes an action instruction corresponding to a to-be-added rule; or if a purpose of the wildcard entry update instruction is to delete a rule, the wildcard entry update instruction may include only a to-be-deleted rule (or find all identifiers of the to-be-deleted rule in the wildcard entry). The network device updates the rule in the wildcard entry according to the to-be-updated rule in the wildcard entry update instruction, and correspondingly modifies the time stamp of the wildcard entry, to update the update time of the wildcard entry.

In actual application, if the network device uses a plurality of cascaded wildcard flow tables, the network device may perform corresponding updating according to an update instruction in each wildcard flow table, and there is no impact between each other.

Optionally, step S203 may include:

obtaining, in the exact match entry, pointing information of the wildcard entry corresponding to the exact match entry;

determining, according to the pointing information, the wildcard entry corresponding to the exact match entry; and obtaining, in the wildcard entry corresponding to the exact match entry, the update time of the wildcard entry corresponding to the exact match entry.

Optionally, the pointing information may be a pointer that points to the wildcard entry corresponding to the exact match entry, or an identifier of the wildcard entry corresponding to the exact match entry.

It should be noted that when a flow table is updated, the control plane delivers a new rule to a data plane, a rule and an update time in a wildcard entry in which the rule is located are updated, and an exact match entry corresponding to the updated wildcard entry needs to be correspondingly updated before using. Whether the exact match entry is correspondingly updated after the corresponding wildcard entry is updated may be determined by determining whether the update time of the wildcard entry corresponding to the exact match entry is before the creation time of the exact match entry. If the update time of the wildcard entry corresponding to the exact match entry is before the creation time of the exact match entry, it indicates that the exact match entry is created after the corresponding wildcard entry is updated, and can be used; or if the update time of the wildcard entry corresponding to the exact match entry is not before the creation time of the exact match entry, it indicates that the corresponding wildcard entry is updated after the exact match entry is created, and the exact match entry cannot be used.

Step S204: Process the data packet according to an action instruction corresponding to the exact match entry.

In this embodiment, the action instruction corresponding to the exact match entry is an action instruction in a wildcard flow table corresponding to the exact match entry. Specifically, the action instruction may include port forwarding, broadcasting, or discarding. Correspondingly, processing the data packet may be: sending the data packet on one or more ports, sending the data packet on all ports, or discarding the data packet.

Step S205: Delete the exact match entry.

As described above, when a flow table is updated, only a wildcard entry is updated, and an exact match entry corresponding to the updated wildcard entry is not updated. When the update time of the wildcard entry corresponding to the exact match entry is not before the creation time of the exact match entry, it indicates that the wildcard entry corresponding to the exact match entry is updated after the exact match entry is created. Therefore, the exact match entry cannot be used, and the exact match entry is deleted, so as to update the exact match entry.

Each time a wildcard entry is updated, all exact match flow tables are searched for an exact match entry that matches the updated wildcard entry and the exact match entry is deleted; by comparison, in this application, the exact match entry corresponding to the updated wildcard entry is deleted when the exact match entry is found, so that an adverse effect caused by searching on a processing speed and performance of a network device is effectively avoided, and an exact match entry is not correspondingly updated each time the wildcard entry is updated. Therefore, a quantity of times of updating the exact match entry is effectively reduced, and the adverse effect on the processing speed and performance of the network device is further reduced.

In addition, when the exact match entry that matches the updated wildcard entry is searched for and deleted, in order to control the adverse effect caused by searching on the network device, a quantity of exact match entries is limited. The wildcard entry is specific to some header fields of the data packet, and when the wildcard entry matches the data packet, all wildcard entries need to sequentially match the data packet, to find a wildcard entry that best matches the data packet (that is, in a fuzzy match manner). However, the exact match entry is specific to all header fields of the data packet, and when the exact match entry matches the data packet, only one exact match entry that matches the data packet needs to be found (that is, in an exact match manner). It can be learned that a matching speed of the exact match entry is far better than that of the wildcard entry, and a larger quantity of exact match entries indicates a higher probability of matching between the data packet and the exact match entry. In this application, there is no adverse effect on the network device, and there is no limitation on the quantity of exact match entries. Compared with a case in which the exact match entry that matches the updated wildcard entry is searched for and deleted, the exact match entry can be fully used to match the data packet, so that a matching speed of the data packet is improved, and a forwarding capability of the network device is improved.

Step S206: Search, by using the information, a wildcard flow table for a wildcard entry that matches the data packet; and when the wildcard entry that matches the data packet is found, perform step S207; or when the wildcard entry that matches the data packet is not found, perform step S208.

In this embodiment, the wildcard entry includes a rule, an action instruction, and a time stamp. The wildcard entry may be specific to some header fields of the data packet, that is, the wildcard entry is used to match values of the some header fields of the data packet. When a value of the rule is the same as a value of a corresponding header field of the data packet, the wildcard entry in which the rule is located is a wildcard entry that matches the data packet.

Step S207: Process the data packet according to an action instruction corresponding to the wildcard entry, and create, in the exact match flow table, an exact match entry in which the information about the header field of the data packet is corresponding to the action instruction corresponding to the wildcard entry.

In this embodiment, the action instruction corresponding to the wildcard flow table is an action instruction in the wildcard entry. Specifically, the action instruction may include port forwarding, broadcasting, or discarding. Correspondingly, processing the data packet may be: sending the data packet on one or more ports, sending the data packet on all ports, or discarding the data packet.

In specific implementation, when the exact match entry is created, the information about the header field of the data packet is used as an exact flow in the created exact match entry, a time of creating the exact match entry is used as a time stamp of the created exact match entry, and a pointer that points to the wildcard entry or an identifier of the wildcard entry is used as pointing information in the created exact match entry.

Step S208: Send the data packet to a control plane.

In specific implementation, if the data packet does not match a rule in the flow table, the data packet is sent to the control plane, and the control plane determines a manner of processing the data packet.

In this embodiment of the present invention, the exact match flow table is searched directly by using the information about the header field of the data packet for the exact match entry that matches the data packet, and when the exact match entry that matches the data packet is found, whether the wildcard entry corresponding to the exact match entry is updated before the creation time of the exact match entry is determined. When the update time of the wildcard entry corresponding to the exact match entry is before the creation time of the exact match entry, the data packet is processed according to the action instruction corresponding to the exact match entry. Before the data packet is processed according to the action instruction corresponding to the exact match entry, it is determined that the update time of the wildcard entry corresponding to the exact match entry is before the creation time of the exact match entry. Therefore, the exact match entry used to process the data packet is valid, there is no need to suspend, in a flow table updating process, searching for a flow entry that matches the data packet to avoid using an exact match entry that is invalid because of updating of the wildcard entry, and flow table updating and flow entry searching can be performed simultaneously. Therefore, there is no delay in data packet processing, a data processing speed is improved, and network performance is improved.

Figure 7:
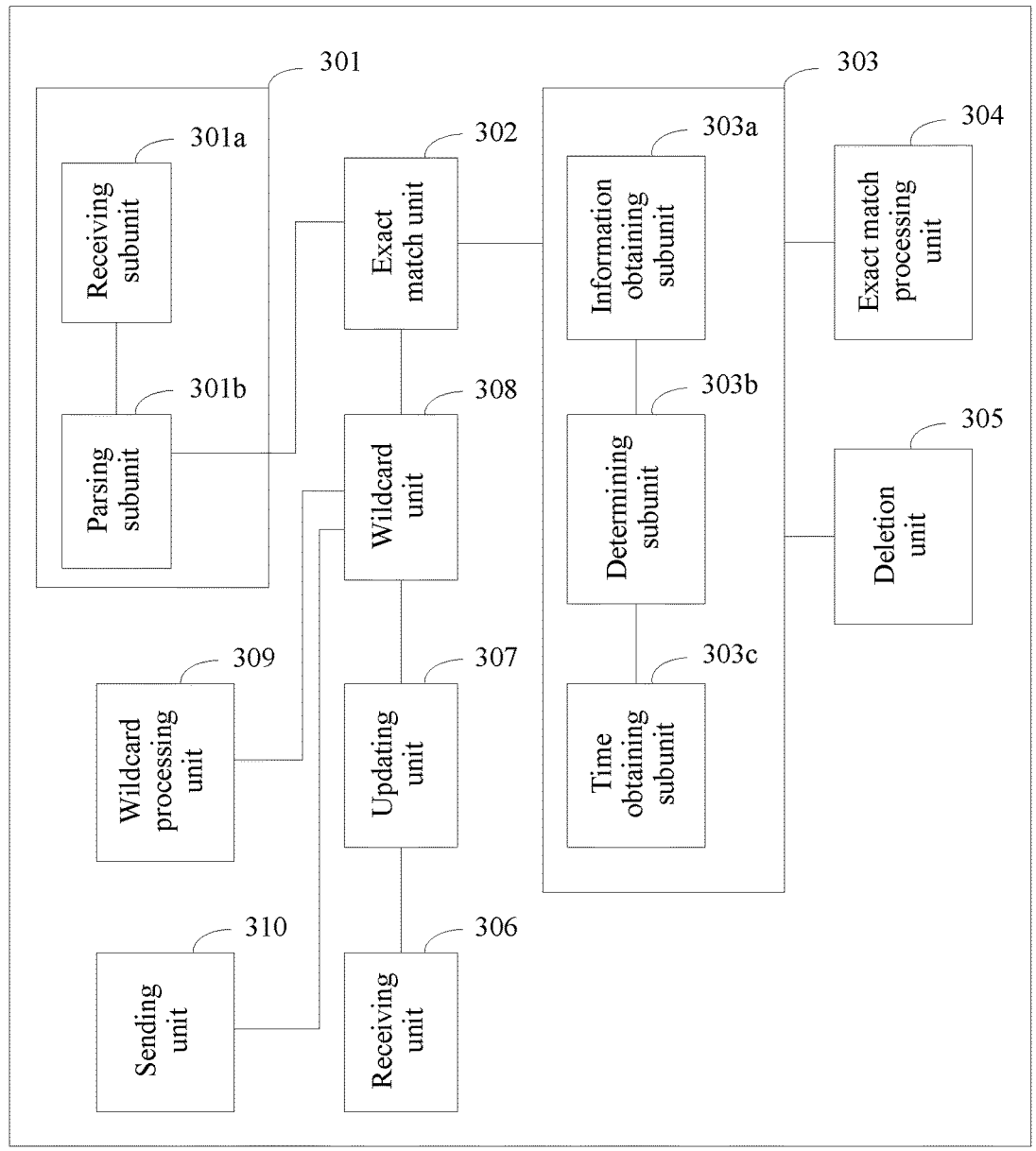
FIG. 7 is a schematic structural diagram of a data processing apparatus according to an embodiment of the present invention.

Referring to FIG. 7, an embodiment of the present invention provides a data processing apparatus that is applicable to the data processing method provided in the embodiment shown in FIG. 5 or FIG. 6. The apparatus includes an obtaining unit 301, an exact match unit 302, a determining unit 303, an exact match processing unit 304, and a deletion unit 305.

The obtaining unit 301 is configured to obtain information about a header field of a data packet. The exact match unit 302 is configured to search, by using the information, an exact match flow table for an exact match entry that matches the data packet. The determining unit 303 is configured to: when the exact match entry that matches the data packet is found, determine whether an update time of a wildcard entry corresponding to the exact match entry is before a creation time of the exact match entry, where an exact flow in the exact match entry is a subset of a rule in the wildcard entry corresponding to the exact match entry. The exact match processing unit 304 is configured to: when the update time of the wildcard entry corresponding to the exact match entry is before the creation time of the exact match entry, process the data packet according to an action instruction corresponding to the exact match entry. The deletion unit 305 is configured to: when the update time of the wildcard entry corresponding to the exact match entry is not before the creation time of the exact match entry, delete the exact match entry.

Optionally, the determining unit 303 may include an information obtaining subunit 303a, a determining subunit 303b, and a time obtaining subunit 303c.

The information obtaining subunit 303a is configured to: obtain, in the exact match entry, pointing information of the wildcard entry corresponding to the exact match entry. The determining subunit 303b is configured to: determine, according to the pointing information, the wildcard entry corresponding to the exact match entry. The time obtaining subunit 303c is configured to obtain, in the wildcard entry corresponding to the exact match entry, the update time of the wildcard entry corresponding to the exact match entry.

Optionally, the pointing information may be a pointer that points to the wildcard entry corresponding to the exact match entry, or an identifier of the wildcard entry corresponding to the exact match entry.

Optionally, the apparatus may further include a receiving unit 306 and an updating unit 307.

The receiving unit 306 is configured to receive a wildcard entry update instruction, and the wildcard entry update instruction includes a to-be-updated rule. The update unit 307 is configured to update a rule and an update time in a wildcard entry according to the wildcard entry update instruction.

Optionally, the apparatus may further include a wildcard unit 308.

The wildcard unit 308 is configured to: when the update time of the wildcard entry corresponding to the exact match entry is not before the creation time of the exact match entry, search, by using the information, a wildcard flow table for a wildcard entry that matches the data packet.

Optionally, the apparatus may further include a wildcard unit 308.

The wildcard unit 308 is configured to: when the exact match entry that matches the data packet is not found, search, by using the information, a wildcard flow table for a wildcard entry that matches the data packet.

Optionally, the apparatus may further include a wildcard processing unit 309.

The wildcard processing unit 309 is configured to: when the wildcard entry that matches the data packet is found, process the data packet according to an action instruction corresponding to the wildcard entry, and create, in the exact match flow table, an exact match entry in which the information is corresponding to the action instruction corresponding to the wildcard entry.

Optionally, the apparatus may further include a sending unit 310.

The sending unit 310 is configured to: when a wildcard entry that matches the data packet is not found, send the data packet to a control plane.

Optionally, the obtaining unit 301 may include a receiving subunit 301a and a parsing subunit 301b.

The receiving subunit 301a is configured to receive the data packet. The parsing subunit 301b is configured to parse the data packet, to obtain the information about the header field of the data packet.

In this embodiment of the present invention, the exact match flow table is searched directly by using the information about the header field of the data packet for the exact match entry that matches the data packet, and when the exact match entry that matches the data packet is found, whether the wildcard entry corresponding to the exact match entry is updated before the creation time of the exact match entry is determined. When the update time of the wildcard entry corresponding to the exact match entry is before the creation time of the exact match entry, the data packet is processed according to the action instruction corresponding to the exact match entry. Before the data packet is processed according to the action instruction corresponding to the exact match entry, it is determined that the update time of the wildcard entry corresponding to the exact match entry is before the creation time of the exact match entry. Therefore, the exact match entry used to process the data packet is valid, there is no need to suspend, in a flow table updating process, searching for a flow entry that matches the data packet to avoid using an exact match entry that is invalid because of updating of the wildcard entry, and flow table updating and flow entry searching can be performed simultaneously. Therefore, there is no delay in data packet processing, a data processing speed is improved, and network performance is improved.

It should be noted that when the data processing apparatus provided in the foregoing embodiment processes data, division of the foregoing functional modules is used only as an example for description. In actual application, the foregoing functions may be allocated to different functional modules and implemented according to a requirement, that is, an internal structure of the apparatus is divided into different functional modules for implementing all or some of the functions described above. In addition, the data processing apparatus and the data processing method embodiment that are provided in the foregoing embodiments pertain to a same concept. For a specific implementation process, refer to the method embodiment, and details are not described herein.

The sequence numbers of the foregoing embodiments of the present invention are merely for illustrative purposes, and are not intended to indicate priorities of the embodiments.

Persons of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A data processing method, wherein the method comprises:
    obtaining information about a header field of a data packet;
    searching, by using the obtained information, an exact match flow table for an exact match entry that matches the data packet;
    when the exact match entry that matches the data packet is found, determining whether an update time of a wildcard entry corresponding to the exact match entry is prior to a creation time of the exact match entry, wherein an exact flow in the exact match entry is a subset of a rule in the wildcard entry corresponding to the exact match entry;
    in response to determining that the update time of the wildcard entry corresponding to the exact match entry is before the creation time of the exact match entry, processing the data packet according to an action instruction corresponding to the exact match entry; and
    in response to determining that the update time of the wildcard entry corresponding to the exact match entry is not before the creation time of the exact match entry, deleting the exact match entry.

2. The method according to claim 1, wherein the determining whether an update time of a wildcard entry corresponding to the exact match entry is before a creation time of the exact match entry comprises:
    obtaining, in the exact match entry, pointing information of the wildcard entry corresponding to the exact match entry;
    determining, according to the pointing information, the wildcard entry corresponding to the exact match entry; and
    obtaining, in the wildcard entry corresponding to the exact match entry, the update time of the wildcard entry corresponding to the exact match entry.

3. The method according to claim 2, wherein the pointing information is at least one of a pointer that points to the wildcard entry corresponding to the exact match entry or an identifier of the wildcard entry corresponding to the exact match entry.

4. The method according to claim 2, wherein the method further comprises:
    receiving a wildcard entry update instruction, wherein the wildcard entry update instruction comprises a to-be-updated rule; and
    updating a rule and an update time in a wildcard entry according to the wildcard entry update instruction.

5. The method according to claim 1, wherein the method further comprises:
    in response to determining that the update time of the wildcard entry corresponding to the exact match entry is not before the creation time of the exact match entry, searching, by using the obtained information, a wildcard flow table for a wildcard entry that matches the data packet.

6. The method according to claim 5, wherein the method further comprises:
    when the wildcard entry that matches the data packet is found:
        processing the data packet according to an action instruction corresponding to the wildcard entry; and
        creating, in the exact match flow table, an exact match entry in which the information is corresponding to the action instruction corresponding to the wildcard entry.

7. The method according to claim 1, wherein the method further comprises:
    when the exact match entry that matches the data packet is not found, searching, by using the obtained information, a wildcard flow table for a wildcard entry that matches the data packet.

8. A data processing apparatus, wherein the apparatus comprises:
    at least one processor;
    a non-transitory computer-readable storage medium coupled to the at least one processor and storing programming instructions for execution by the at least one processor, the programming instructions instruct the at least one processor to:
        obtain information about a header field of a data packet;
        search, by using the obtained information, an exact match flow table for an exact match entry that matches the data packet;
        when the exact match entry that matches the data packet is found, determine whether an update time of a wildcard entry corresponding to the exact match entry is prior to a creation time of the exact match entry, wherein an exact flow in the exact match entry is a subset of a rule in the wildcard entry corresponding to the exact match entry;
        in response to determining that the update time of the wildcard entry corresponding to the exact match entry is before the creation time of the exact match entry, process the data packet according to an action instruction corresponding to the exact match entry; and
        in response to determining that the update time of the wildcard entry corresponding to the exact match entry is not before the creation time of the exact match entry, delete the exact match entry.

9. The data processing apparatus of claim 8, wherein the determining whether an update time of a wildcard entry corresponding to the exact match entry is before a creation time of the exact match entry comprises:

obtaining, in the exact match entry, pointing information of the wildcard entry corresponding to the exact match entry;

determining, according to the pointing information, the wildcard entry corresponding to the exact match entry; and obtaining, in the wildcard entry corresponding to the exact match entry, the update time of the wildcard entry corresponding to the exact match entry.

10. The data processing apparatus of claim 9, wherein the pointing information is at least one of a pointer that points to the wildcard entry corresponding to the exact match entry or an identifier of the wildcard entry corresponding to the exact match entry.

11. The data processing apparatus of claim 9, wherein the programming instructions instruct the at least one processor to:

receive a wildcard entry update instruction, wherein the wildcard entry update instruction comprises a to-be-updated rule; and update a rule and an update time in a wildcard entry according to the wildcard entry update instruction.

12. The data processing apparatus of claim 8, wherein the programming instructions instruct the at least one processor to:

in response to determining that the update time of the wildcard entry corresponding to the exact match entry is not before the creation time of the exact match entry, search, by using the obtained information, a wildcard flow table for a wildcard entry that matches the data packet.

13. The data processing apparatus of claim 8, wherein the programming instructions instruct the at least one processor to:

when the exact match entry that matches the data packet is not found, search, by using the obtained information, a wildcard flow table for a wildcard entry that matches the data packet.

14. The data processing apparatus of claim 13, wherein the programming instructions instruct the at least one processor to:

when the wildcard entry that matches the data packet is found:

process the data packet according to an action instruction corresponding to the wildcard entry; and create, in the exact match flow table, an exact match entry in which the information is corresponding to the action instruction corresponding to the wildcard entry.

* * * * *